(12) United States Patent
Dung

(10) Patent No.: US 7,194,917 B2
(45) Date of Patent: Mar. 27, 2007

(54) METHOD AND DEVICES FOR MONITORING THE CLAMPING PRESSURE, ORIGINATING FROM AN ADJUSTING CYLINDER AND FIXING AN EXCHANGEABLE ELECTRODE AT THE ELECTRODE-SUPPORTING ARM

(76) Inventor: Arndt Dung, Heuland 54, D-58093 Hagen (DE)

(\*) Notice: Subject to any disclaimer, the term of this patent is extended or adjusted under 35 U.S.C. 154(b) by 81 days.

(21) Appl. No.: 11/074,240

(22) Filed: Feb. 23, 2005

(65) Prior Publication Data
US 2005/0257624 A1    Nov. 24, 2005

(51) Int. Cl.
*G01N 3/02* (2006.01)

(52) U.S. Cl. .................................................... 73/856

(58) Field of Classification Search ................ 736/856
See application file for complete search history.

(56) References Cited

U.S. PATENT DOCUMENTS

| | | | | |
|---|---|---|---|---|
| 4,138,118 A | * | 2/1979 | Budney | 473/202 |
| 5,417,464 A | * | 5/1995 | Seaberg et al. | 294/88 |
| 5,430,954 A | * | 7/1995 | Best et al. | 33/793 |
| 5,445,613 A | * | 8/1995 | Orth | 604/66 |
| 6,520,022 B1 | * | 2/2003 | Anderson et al. | 73/756 |
| 6,758,098 B1 | * | 7/2004 | Nunnelee | 73/760 |
| 2003/0220542 A1 | * | 11/2003 | Belson et al. | 600/109 |

\* cited by examiner

*Primary Examiner*—Max Noori
(74) *Attorney, Agent, or Firm*—Max Fogiel

(57) ABSTRACT

The aim of the invention is to prevent a detrimental effect on the operation of electric smelting furnaces. To achieve this, a pressure cell (41), which continuously measures the clamping force, is allocated to the actuating cylinder (21) that is responsible for fixing the interchangeable electrode (31) into the electrode support arm (11), said pressure cell continuously transmitting the measured values to a measured value display that is located at a distance from the furnace. This obviates the need for the previous conventional method of checking the current clamping pressure by placing a clamping pressure gauge in the electrode holder, e.g. when the electrode is replaced, without running the risk of a breakdown caused by the detachment of the electrode, triggered by an uncontrolled drop in the clamping pressure.

12 Claims, 2 Drawing Sheets

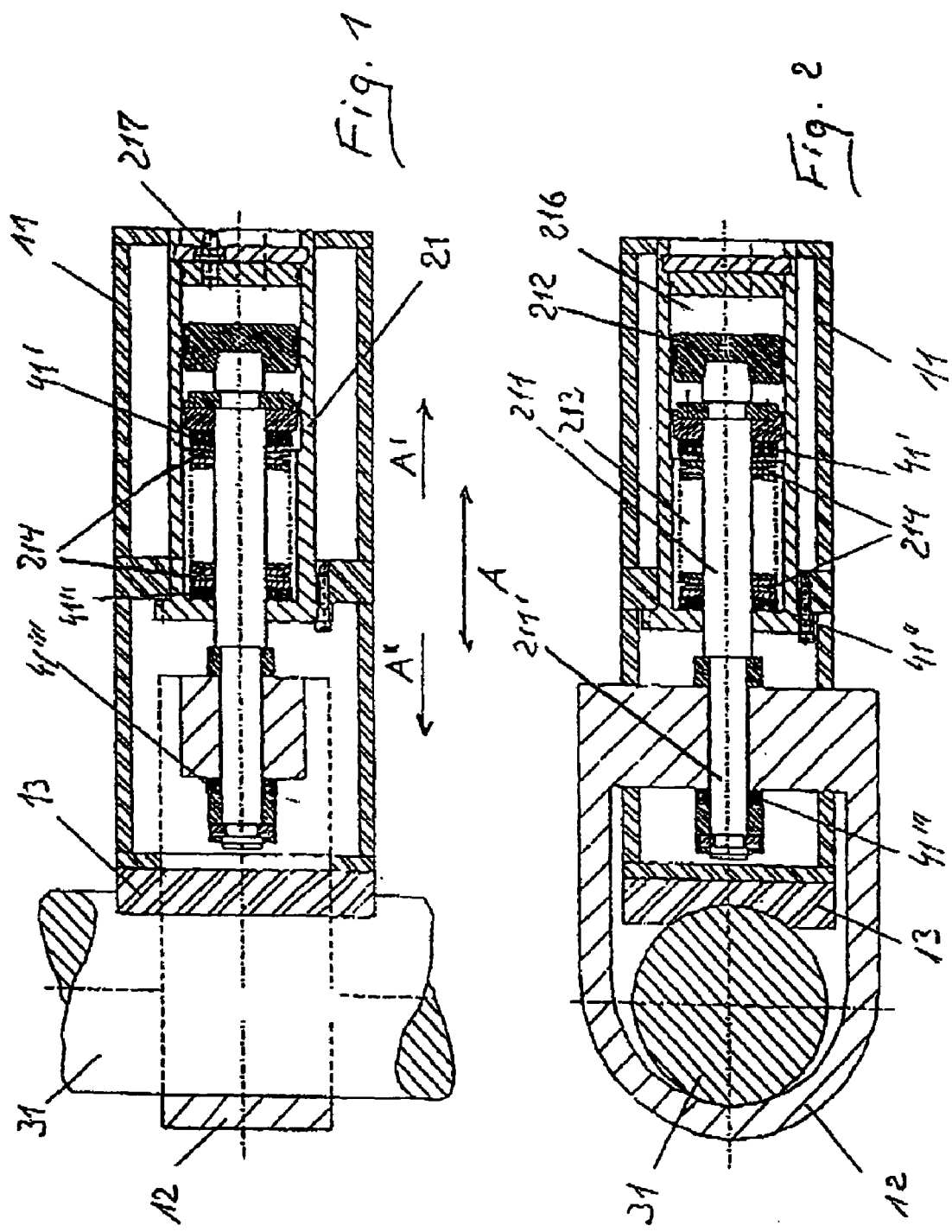

METHOD AND DEVICES FOR MONITORING THE CLAMPING PRESSURE, ORIGINATING FROM AN ADJUSTING CYLINDER AND FIXING AN EXCHANGEABLE ELECTRODE AT THE ELECTRODE-SUPPORTING ARM

BACKGROUND OF THE INVENTION

The invention relates to a method and devices for monitoring the clamping pressure, which originates from an adjusting cylinder and with which the exchangeable electrode of an electric furnace is clamped at the free end of the electrode-supporting arm.

According to the state of the art, the electrode, exchangeably assigned to the electrode-carrying arm of electric furnaces, is clamped in the seat, provided for this purpose at the supporting arm with the help of a single stage cylinder, the piston rod of which, retracting or extending under the force of a spring, brings about the clamping of the electrode in the seat. Depending on the installed situation of the adjusting cylinder, the pressure springs are in the annular space or in the cylinder space at the bottom of the adjusting cylinder. The clamping is disengaged by supplying a pressure medium to the cylinder space at the bottom or to the annular space of the adjusting cylinder, under the action of which the extension and retraction of the piston rod against the force of the adjusting spring, which is located in the annular space 213 of the cylinder 21 and brings about the extension and retraction situation, takes place. In order to ensure that there is a sufficient clamping force for clamping the electrode while the operation is running, the clamping force must be checked at regular intervals in such a manner that, with the electrode removed from the electrode seat, a device, for measuring the clamping pressure and designed for the electrode and, with that, also for the seat, is transferred into the electrode seat and the cylinder or cylinders is/are adjusted. This type of monitoring is relatively time-consuming to the detriment of the running operation. It also does not exclude a release of the clamped electrode during the running operation in the case of a pressure drop, which was not detected initially, with corresponding consequences for the course of the operation.

SUMMARY OF THE INVENTION

With this as background, it is an object of the invention to provide the possibility of monitoring the clamping force of the compression spring, clamping the electrode in the electrode seat, while the operation is running.

Pursuant to the invention, this objective is accomplished with a method for monitoring the clamping pressure, which originates from one or more adjusting cylinders and with which the exchangeable electrode of an electric furnace is clamped at the free end of the electrode-supporting arm, the method being characterized in that the clamping pressure is measured continuously by a pressure load cell, assigned to the adjusting cylinder and acted upon by the clamping pressure, and the value measured is transmitted to a measured-value display remote from the furnace.

Basically, the possibility exists of transmitting the values measured, which originate from the pressure load cell, over a line, starting out from the adjusting cylinder and extending through the electrode-supporting arm up to the measured value display remote from the furnace to the measured-value display. However, this method of transmitting measured values is risky. A wireless transmission of the measured values to the measured value display, remote the furnace, is therefore advisable. A transmitter, supplied by a battery, is therefore assigned to the pressure load cell for the wireless transmission of the measured values, going out from the pressure load cell to the measured-value display remote from the furnace. Over the transmitter, the information regarding clamping pressure, pressure drop and/or pulses for initiating signals are transmitted to a receiver assigned to the measured-value display remote from the furnace.

The measured-value display, which is usually installed at the control station and constantly provides information concerning the actual clamping pressure at the adjusting cylinder, signals of the furnace crew especially also when a drop in the pressure, clamping the electrode in the electrode-supporting arm, sets in. Accordingly, the furnace crew can react in good time, that is, exchange the adjusting cylinder while avoiding any operational malfunction In this way, the previously customary checking of the clamping pressure with the help of a device for measuring the clamping force, which otherwise is used at regular intervals to the detriment of the running operation, is omitted.

Values can be measured using, for example, the piezo effect. If necessary, an amplifier is assigned to the measured-value transmitter. Especially for a wireless transmission of the measured values to the measured-value display, a discrete transmission of the measured values to the measured-value display is advisable. It has proven to be appropriate to integrate a signaling device, which responds acoustically and/or optically when the clamping pressure drops below a minimum value, in the measured-value display.

The inventive method is carried out on the basis of the use of a pressure load cell, which is acted upon directly or indirectly by the clamping pressure. Moreover, the pressure load cell, supported at an abutment, may be disposed at the overhang of the piston rod over the cylinder. Especially when a wireless transmission of the measured values, going out from the pressure load cell to the measured-value display remote from the furnace is provided, the possibility of disposing the pressure load cell in the cylinders space of the adjusting cylinder, accommodating the pressure springs, is available. A particularly installation-friendly solution arises when the pressure load cell, which can be acted upon by the pressure in the bottom space of the adjusting cylinder, is mounted ahead of the adjusting cylinder

BRIEF DESCRIPTION OF THE DRAWINGS

The invention is explained further by means of examples in the drawing, in which FIG. 1 shows a vertical section of the end region of an electrode-supporting arm with a clamped electrode, the latter being truncated, FIG. 2 shows a horizontal section of an ensemble in FIG. 1

DESCRIPTION THE PREFERRED EMBODIMENTS

Figure 3:
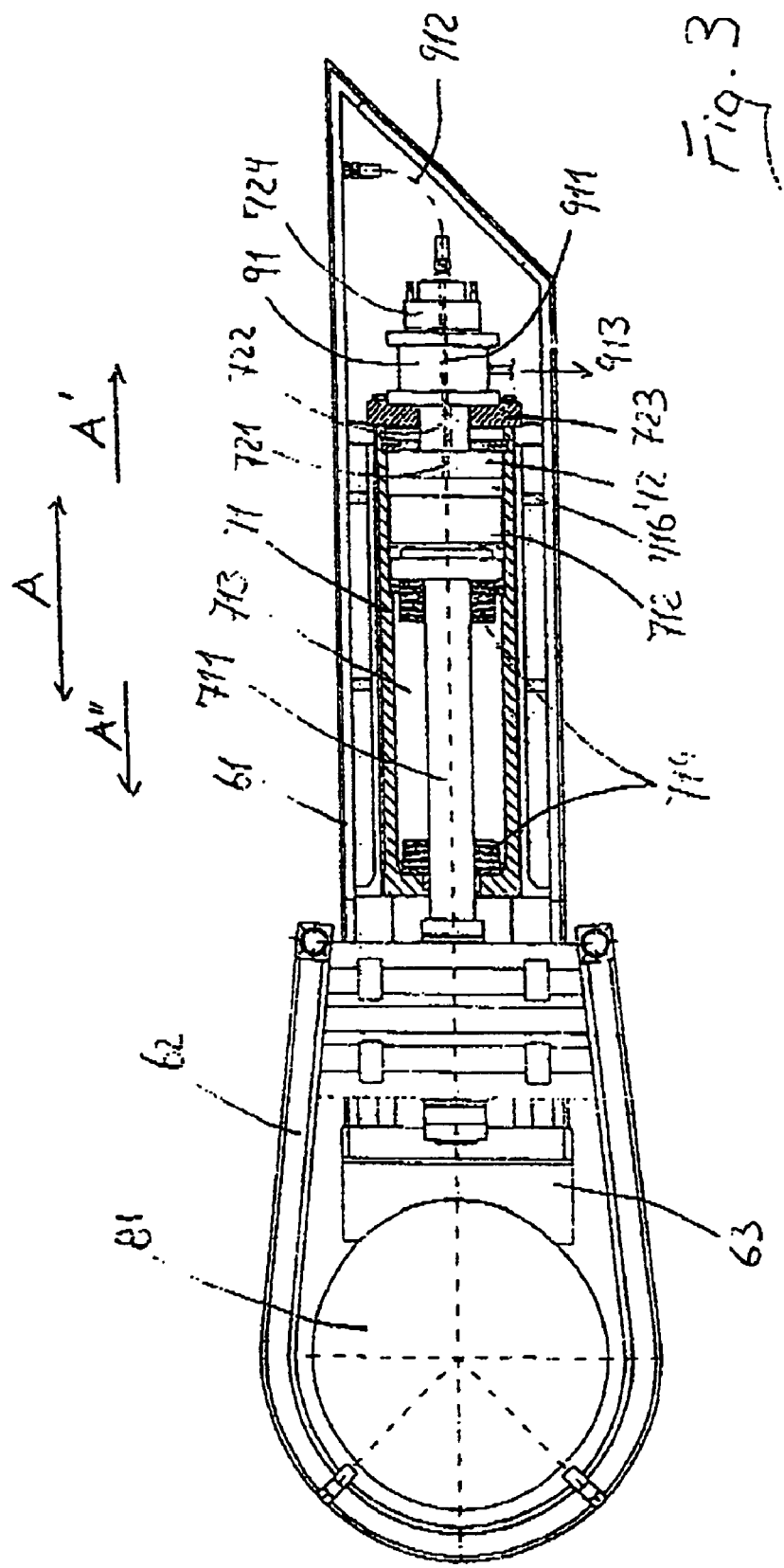
FIG. 3 shows the preferred embodiment of the inventive solution in a representation corresponding to that of FIG. 2.

The end region of the electrode-supporting arm, shown diagrammatically in FIGS. 1 and 2, is labeled 11. The clip 12, assigned to the end region of the electrode-supporting arm 4, can be shifted relative to and guided at the electrode-supporting arm 11 in the directions indicated by the double arrow A. In the representation given in the drawing, it can be inferred that the electrode 31, under the action of the applied clip 12, is in contact with the contact jaw 13, which is in front of the head of the electrode-supporting arm. The adjustment of the clip, bringing about the clamping of the electrode, is made by means of the single-stage cylinder 21, which is mounted in the electrode-supporting arm and the piston rod 211 of which engages the clip 12 with its free and 211'. Under the action of a set of springs 214, which is located in the annular space 213 of the cylinder and acts on the piston rod 211, the piston rod 211 brings about the adjustment of the clip 12 (arrow A'). For disengaging the clamping element (arrow A"), a pressure a pressure medium, overcoming the force of the set of springs 214 that brings about the clamping, is supplied (217) to the bottom space 216 of the cylinder 21.

Pursuant to the invention, a load cell 41, which measures the actual pressure in the adjusting cylinder 21 continuously, is assigned to the adjusting cylinder 21. The value measured is transmitted without a wire or a pipeline to a measured-value display remote from the furnace. There is a plurality of possibilities, which are indicated in FIGS. 1 and 2, for installing the load cell. For example, the load cell may be behind (41'), as well as in front (41") of the set of springs (214). As a further possibility (41'"), the load cell may be disposed between the clip 12 and the head of the piston rod 211 penetrating the clip 12.

In connection with the solution, which can be inferred from FIG. 3 and from which a modified mounting of the adjusting cylinder 71 in the headpiece 61 of an electrode-supporting arm can be inferred, the inventive pressure load cell 91, which is used, is assigned to the bottom of the adjusting cylinder 71 outside of the adjusting cylinder 71. In particular, the clip 62 is also once again displaceable in the axial direction indicated by the double arrow A at the headpiece 61 of the electrode-supporting arm. The adjustment of the clip 62, bringing about the clamping of the electrode 81, is also accomplished once again by way of the single stage adjusting cylinder, which is mounted in the electrode-supporting arm, that is, in the headpiece 61 of the supporting arm. The piston rod 711 of the single-stage adjusting cylinder 71 engages the clip 62 with its free end. The set of springs 714 in the annular space 713 of the adjusting cylinder 71, acting on the piston 712 also once again brings about the adjustment of the piston rod 711 in the direction of the A' and the clamping of the electrode 81. For disengaging the clamping by shifting the piston rod 711 in the direction of arrow A" and, with that, also the clip 62 in the direction of arrow A", a pressure medium is also supplied once again into the bottom space 716 of the clamping cylinder 71, and overcomes the spring force, which is inherent in the set of springs 714 and brings about the clamping of the electrode 81.

The pressure load cell 91, through which there is a central passage 911, which goes over into a borehole 721 in the bottom 72 of the adjusting cylinder, discharging in the bottom space 716 of the adjusting cylinder is disposed ahead of the bottom 72 of the adjusting cylinder 71. On the side of the pressure load cell averted from the adjusting cylinder 71, the pressure-medium pipeline 912 for supplying the disengaging pressure to the bottom space 716 of the adjusting cylinder, is connected to the passage 911. The connection for a pipeline, leading to a measured value display (measurement observatory) remote from the furnace and transmitting the pressure at the pressure load cell 911, is labeled 913. In connection with this solution, the measured values, obtained in the pressure load cell 91, can of course also be transmitted without a connecting pipeline (913) to the measurement observatory.

The force, subjected to the measurement, is present here at the pressure load cell 91 over the cylinder bottom 72, with which the pressure load cell is combined, in the case shown, over a connecting piece 722, which starts out from the bottom 72 and on which the pressure load cell 91, clamped between an abutment 723, which is supported at the supporting arm (61), and a screw coupling 724 leads. The nut 724 then also serves for setting the desired pre-tension.

If the clamping pressure, which fixes the electrode 81 and originates from the set of springs forming a component of the adjusting cylinder 71, falls below a critical value, which no longer assures the clamping of the electrode, this state is indicated by the pressure load cell 91, which is assigned to the adjusting cylinder 71, in the one measurement observatory that is remote from the furnace. With that, the operating personnel receives, without further ado, notice that it is necessary to exchange the adjusting cylinder, at least the set of springs forming the component of the adjusting cylinder.

The invention claimed is:

1. A device for measuring clamping pressure originating from an adjusting cylinder for clamping an exchangeable electrode of an electric furnace at a free end of an electrode-supporting arm, comprising: a pressure load cell for measuring continuously said clamping pressure; said adjusting cylinder being associated with said pressure load cell, said pressure load cell being acted upon by said clamping pressure; a measured-value display remote from said furnace and receiving measured values from pressure load cell; said adjusting cylinder having a bottom, said pressure load cell being in front of said bottom and connected positively with said bottom; a connecting member extending from said bottom; an abutment supported at said supporting arm; and a screw coupling, said pressure load cell being clamped on said connecting arm between said abutment and said screw coupling.

2. A device for measuring clamping pressure originating from an adjusting cylinder for clamping an exchangeable electrode of an electric furnace at a free end of an electrode-supporting arm, comprising: a pressure load cell for measuring continuously said clamping pressure; said adjusting cylinder being associated with said pressure load cell, said pressure load cell being acted upon by said clamping pressure; a measured-value display remote from said furnace and receiving measured values from pressure load cell; said adjusting cylinder having a bottom, said pressure load cell being in front of said bottom and connected positively with said bottom; said pressure load cell having a bore extending into a bottom space of said adjusting cylinder.

3. The device as defined in claim 1, wherein said display is a digital display.

4. The device as defined in claim 1, wherein said display is an analog display.

5. The device as defined in claim 1, including signal means integrated in said display for signaling when said pressure drops below a minimum level.

6. The device as defined in claim 5, wherein said signal means comprises optical means.

7. The device as defined in claim 5, wherein said means comprises acoustical means.

8. The device as defined in claim 2, wherein said display is a digital display.

9. The device as defined in claim 2, wherein said display is an analog display.

10. The device as defined in claim 2, including signal means integrated in said display for signaling when said pressure drops below a minimum level.

11. The device as defined in claim 10, wherein said signal means comprises optical means.

12. The device as defined in claim 10, wherein said signal means comprises acoustical means.

* * * * *